US011568084B2

(12) United States Patent
Ramamurthy et al.

(10) Patent No.: US 11,568,084 B2
(45) Date of Patent: Jan. 31, 2023

(54) METHOD AND SYSTEM FOR SEQUENCING ASSET SEGMENTS OF PRIVACY POLICY USING OPTIMIZATION TECHNIQUES

(71) Applicant: Tata Consultancy Services Limited, Mumbai (IN)

(72) Inventors: Arun Ramamurthy, Pune (IN); Shree Nivas, Pune (IN); Mangesh Sharad Gharote, Pune (IN); Vijayanand Mahadeo Banahatti, Pune (IN); Sachin Premsukh Lodha, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 82 days.

(21) Appl. No.: 17/163,621

(22) Filed: Feb. 1, 2021

(65) Prior Publication Data
US 2022/0147649 A1    May 12, 2022

(30) Foreign Application Priority Data
Nov. 12, 2020    (IN) ............................ 202021049447

(51) Int. Cl.
*G06F 21/62*    (2013.01)
*H04L 9/40*    (2022.01)

(52) U.S. Cl.
CPC .......... *G06F 21/6245* (2013.01); *G06F 21/62* (2013.01); *G06F 21/6218* (2013.01); *H04L 63/102* (2013.01)

(58) Field of Classification Search
CPC ...... G06F 21/60; G06F 21/62; G06F 21/6218; G06F 21/6245
See application file for complete search history.

(56) References Cited

U.S. PATENT DOCUMENTS 10,356,456 B2    7/2019  Ranjeet et al.
11,315,053 B1 *  4/2022  Powell ............ G06Q 10/06313
(Continued)

FOREIGN PATENT DOCUMENTS

WO    WO 2019/007477 A1    1/2019
WO    WO 2020/029235 A1    2/2020

OTHER PUBLICATIONS

Liu et al., "Optimization Algorithms for the Selection of Key Frame Sequences of Variable Length," ECCV, LNCS 2353, pp. 403-417 (2002).

*Primary Examiner* — Ashokkumar B Patel
*Assistant Examiner* — D'Arcy Winston Straub
(74) *Attorney, Agent, or Firm* — Finnegan, Henderson, Farabow, Garrett & Dunner, LLP

(57) ABSTRACT

The disclosure relates to a method and a system for sequencing asset segments of privacy policy using optimization techniques. The asset segments are sequenced based on several constraints associated with preferences of a source entity and a target entity. Further the disclosure also determines a target entity violation factor that represents a conflict between the preferences associated with the source entity and the target entity. In an embodiment the disclosed method and system optimally sequences the plurality of asset segments using several optimization techniques that include a basic sequence generation technique, a source entity sequence optimizing technique and a target entity sequence optimizing technique considering constraints. Hence the disclosure bridges a communication gap between several stakeholders by optimally displaying the most relevant privacy policy (mapped to the asset segments) considering the constraints or preferences associated with both the source entity and the target entity.

12 Claims, 3 Drawing Sheets

(56) References Cited

U.S. PATENT DOCUMENTS

| | | | |
|---|---|---|---|
| 2003/0112791 A1* | 6/2003 | Suryanarayana | H04L 67/02 370/352 |
| 2021/0288965 A1* | 9/2021 | Afroz | G06F 16/9537 |

* cited by examiner

US 11,568,084 B2

METHOD AND SYSTEM FOR SEQUENCING ASSET SEGMENTS OF PRIVACY POLICY USING OPTIMIZATION TECHNIQUES

CROSS-REFERENCE TO RELATED APPLICATIONS AND PRIORITY

The present application claims priority from Indian provisional application no. 202021049447, filed on Nov. 12, 2020.

TECHNICAL FIELD

The disclosure herein generally relates to a sequencing problem and, more particularly, to a method and a system for sequencing asset segments of a privacy policy using optimization techniques.

BACKGROUND

Most online services available nowadays operate with terms and conditions that are text-based online "privacy policy" content, wherein the 'Privacy policy' statement discloses the practices carried out by an organization to gather, use and, share users' data. In the current digital era, reading and understanding privacy policies has become a critical issue with the advent of the European Union's much touted General Data Protection Regulation (GDPR) that emphasizes on "privacy by default". The GDPR places the onus on users to make the right decision with regards to their personal data processing by organizations and further the GDPR also sets rules for organizations to make the communication pertaining to personal data processing transparent, intelligible and concise using plain language.

Despite the GDPR and the requirement for reading-comprehending privacy policies, majority of users skip or ignore the privacy policy notices while joining a social network via internet for the first time, as the user would not be willing to read-comprehend the text-based online privacy policy content. While few users who try to read-comprehend the text-based privacy policies struggle to grasp them, as the text-based online privacy policy content is usually lengthy and complex. Further the online privacy policies often contain ambiguous language that undermines the purpose and value of the privacy policies for end users. Hence the effective communication of privacy policies from the online service to a user remains challenging due to verbosity, legal jargon, complexity and lack of comprehensibility.

The challenges in effective communication of privacy policies from the online service to a user has forced organizations to reconsider and rewrite their privacy policies in other legible formats/interesting formats that may be user-friendly and grasp the interest of the reader. Additionally, in certain scenarios organizations/online services may be interested in certain specific contents of the privacy policy, the users may be interested in another set of specific contents of the privacy policy, while there maybe certain specific content that are relevant and important for both user and organizations/online services. Here, it is very important to strike/decide/optimize the right balance between the interests of the organizations/online services and the users, while communicating the privacy policies.

SUMMARY

Embodiments of the present disclosure present technological improvements as solutions to one or more of the above-mentioned technical problems recognized by the inventors in conventional systems. For example, in one embodiment, a method for sequencing asset segments of a privacy policy using optimization techniques is provided. The method includes receiving an input associated with a privacy policy of a source entity the input comprising of a plurality of asset segments and a plurality of constraints, wherein the plurality of constraints comprises one or more preferences associated with the source entity and one or more preferences associated with a target entity. Further, the method includes generating a basic sequence for the plurality of asset segments, through a basic sequence generation technique wherein the basic sequence for an asset segment comprises identifying a position for the asset segment of the plurality of asset segments. Further, the method includes generating a source entity sequence by optimizing the basic sequence, through a source entity sequence optimizing technique based on the one or more preferences associated with the source entity. Also, the method includes generating a target entity sequence and a target entity violation factor by optimizing the source entity sequence, through a target entity sequence optimizing technique based on the one or more preferences associated with the target entity and minimizing the target entity violation factor based on the one or more preferences associated with the target entity.

In another aspect, a system for sequencing asset segments of a privacy policy using optimization techniques is provided. The system includes a memory storing instructions, one or more communication interfaces; and one or more hardware processors coupled to the memory via the one or more communication interfaces, wherein the one or more hardware processors are configured by the instructions to receive an input associated with a privacy policy of a source entity the input comprising of a plurality of asset segments and a plurality of constraints, wherein the plurality of constraints comprises one or more preferences associated with the source entity and one or more preferences associated with a target entity. The one or more hardware processors are further configured by the instructions for generating a basic sequence for the plurality of asset segments, through a basic sequence generation technique wherein the basic sequence for an asset segment comprises identifying a position for the asset segment of the plurality of asset segments. Also, the one or more hardware processors are further configured by the instructions for generating a source entity sequence by optimizing the basic sequence, through a source entity sequence optimizing technique based on the one or more preferences associated with the source entity. Furthermore, the one or more hardware processors are further configured by the instructions for generating a target entity sequence and a target entity violation factor by optimizing the source entity sequence, through a target entity sequence optimizing technique based on the one or more preferences associated with the target entity and minimizing the target entity violation factor based on the one or more preferences associated with the target entity.

Another embodiment provides a non-transitory computer-readable medium having embodied thereon a computer program for a computer readable program, wherein the computer readable program, when executed by one or more hardware processors, causes sequencing asset segments of a privacy policy using optimization techniques is provided. The program includes receiving an input associated with a privacy policy of a source entity the input comprising of a plurality of asset segments and a plurality of constraints, wherein the plurality of constraints comprises one or more preferences associated with the source entity and one or more preferences associated with a target entity. Further, the program includes generating a basic sequence for the plurality of asset segments, through a basic sequence generation technique wherein the basic sequence for an asset segment comprises identifying a position for the asset segment of the plurality of asset segments. Further, the program includes generating a source entity sequence by optimizing the basic sequence, through a source entity sequence optimizing technique based on the one or more preferences associated with the source entity. Also, the program includes generating a target entity sequence and a target entity violation factor by optimizing the source entity sequence, through a target entity sequence optimizing technique based on the one or more preferences associated with the target entity and minimizing the target entity violation factor based on the one or more preferences associated with the target entity.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
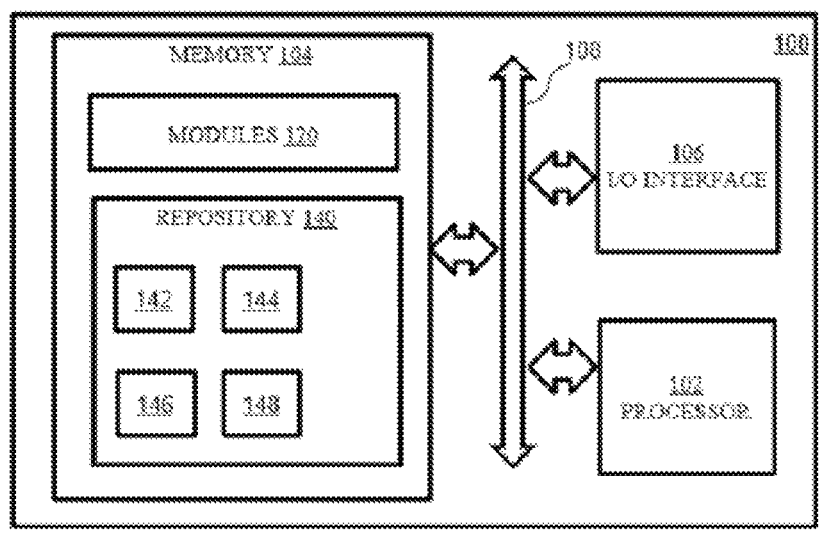
FIG. 1 illustrates a block diagram of a system for sequencing asset segments of a privacy policy using optimization techniques, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Most online services available nowadays operate with terms and conditions that are text-based online "privacy policy" content, wherein the 'Privacy policy' statement discloses the practices carried out by an organization to gather, use and, share users' data. Existing methods for design of online privacy statements include platforms for privacy statements and role of purpose in privacy requirements. Most of the privacy statements includes a large amount of content in common which can be categorized in broader sections. Further, the privacy policies contain incomplete and ambiguous information flow statements. Besides that, language and terms used in the privacy policies obviate the end users from reading the large textual content for understanding in context of their requirement. Thus, the typical text-based privacy policies poses challenges, such as ineffectiveness of text-based privacy policy statements, lack of comprehensibility to average user, issue of non-inclusiveness in light of increasing demographic variance, and so on. Owing to the above challenges a user may not read through the policy, however important it is for him/her to know about it.

Video is considered to be an effective medium for technical assistance and delivering information. An audio-visual medium may be a user friendly and widely accepted medium of communication. Choosing animation-based visuals as an alternative for delivering text-based content raises user motivation, improves communication and expands potential for deeper understanding of the subject concepts. Hence displaying the private policies to a user as a video may be more efficient compared to text-based private policies. Additionally, in certain scenarios organizations/online services may be interested in certain specific contents of the privacy policy, the users may be interested in another set of specific contents of the privacy policy, while there may be certain specific content that are relevant and important for both user and organizations/online services. Here, it is very important to strike/decide/optimize the right balance between the interests of the organizations/online services and the users, while communicating the privacy policies. The private policy can be further divided into several sub-policies, each of which may comprise several sub-topics. An example of the asset segments privacy policies along with the corresponding sub-asset segments for each asset segment is described in TABLE 1. Herein, it will be understood that the example provided in table 1 is only for illustrative purposes and should not be construed as limiting to the embodiments.

TABLE 1

Example of asset segments of privacy policy with corresponding sub-asset segments

| Asset segments of Privacy Policy | Sub-asset segments |
|---|---|
| Cookies | What are Cookies? |
|  | Disabling Cookies |
|  | Features enabled by Cookies |
|  | Do we store Cookies? |
|  | How Cookies are stored? |
| Personal Information | Need of collecting PII |
|  | Different types of PII collected |
|  | How we collect PII? |
|  | What is personally identifiable information PII? |
| Children's Policies | Can children access the services? |
|  | Advertisement specifications for children |
|  | Parents' consent requirements |
|  | Parent monitoring |
|  | Services available for children |
|  | Minimum age requirement |

An example of the asset segments privacy policies with constraints that include a plurality of organization preferences and a plurality of user preferences is described below under two sections titled organization preference and user preference:

Organization Preference:
In cookies asset segment, organization prefers the sub-asset segment "What are Cookies?" to be sequenced before other sub-assets. Similarly, organization also prefers to: a) Sequence sub-asset "Do we store cookies?" before sub-asset "Features enabled by Cookies" and b) Sequence sub-asset "Features enabled by Cookies" before sub-asset "How Cookies are stored?".

In personal information asset segment, organization prefers the sub-asset segment "What is personally identifiable information PII?" to be sequenced before other sub-assets.

In children's policies asset segment, organization prefers the sub-asset segments "Can children access the services?" and "Minimum age requirement" to be sequenced before other sub-assets.

Further the organization prefers to sequence the "Personal Information" asset segment before other segments and to sequence the "Privacy Shield" asset segment after other segments.

Also, the organization prefers to sequence "Information Sharing" and "Information Security" before "Third Party Advertisers".

User Preferences:

In cookies asset segment, the user prefers to view "Disabling Cookies" sub-asset first since he/she is interested in knowing how to disable cookies.

In personal information asset segment, the user prefers to view "Need of collecting PII" and "Different types of PII collected" before other sub-asset segments since he/she is interested in knowing what information is collected from him/her and how the collected information is used.

In children's policies asset segment, the user prefers to view "Parents' consent requirements" and "Parent monitoring" before other sub-asset segments since he/she is interested in knowing the role of parents.

Further the user prefers to view "Children's Policies" before other asset segments.

In an experimental scenario, a study was performed to determine the preference of displaying the privacy policies of different organizations ranging from e-Commerce, retail, technology, entertainment, banking and finance as shown in below TABLE 2. Herein, it will be understood that the example provided in TABLE 2 is only for illustrative purposes and should not be construed as limiting to the embodiments.

TABLE 2

Example of different organizations across several domains

| Domains | | | | | | | | |
|---|---|---|---|---|---|---|---|---|
| Entertainment | | | Banking | | | E-retail | | |
| Netflix | Hotstar | Amazon | ICICI | SBI | HSBC | Flipkart | E-Bay | Amazon |

For experiment purpose the content of the privacy policies of the different organizations can be categorized into distinct sections with similar agendas. Nine categories are labelled/identified with a position from A to I for identifying the sequence in each of the privacy policy as shown in the TABLE 3. Herein, it will be understood that the example provided in TABLE 3 is only for illustrative purposes and should not be construed as limiting to the embodiments.

TABLE 3

Example of categorization of contents of privacy policy

| Categorization | |
|---|---|
| Personal information | A |
| Cookies | B |
| Information Sharing | C |
| Information Security | D |
| Third Party Advertisers | E |
| Accessible information | F |
| Customer Choices | G |
| Children's privacy | H |
| Privacy Shields | I |

Each privacy policy was analyzed, and a sequence was identified by relating the occurrence of content from text-based policy to the categories mentioned in TABLE 4. Herein, it will be understood that the example provided in TABLE 4 is only for illustrative purposes and should not be construed as limiting to the embodiments.

TABLE 4

Example of sequence of categorized contents of privacy policy

| Domains | | | | | | | | |
|---|---|---|---|---|---|---|---|---|
| Entertainment | | | Banking | | | E-retail | | |
| Netflix | Hotstar | Amazon | ICICI | SBI | HSBC | Flipkart | E-Bay | Amazon |
| F | F | A | A | A | D | A | D | A |
| A | A | B | D | B | E | B | A | B |
| C | E | C | F | C | B | C | I | C |
| E | C | D | G | D | G | D | E | D |
| G | G | E | I | E | A | G | C | E |
| I | H | F | C | F | C | E | F | F |
| D | D | G | E | G | F | F | G | G |
| H | B | H | B | I | I | I | B | H |
| B | I | I |  | H |  |  |  | I |

Hence based on the experiment, it was concluded that sequence is not consistent for different privacy policies within and outside domains as well. Further privacy policies in some domains such as Banking do not contain specific information related to Children's Privacy Policies out of 6 policies combining Banking and e-Retail domains, 4 policies do not contain category H—Children's Privacy Policy.

Figure 2:
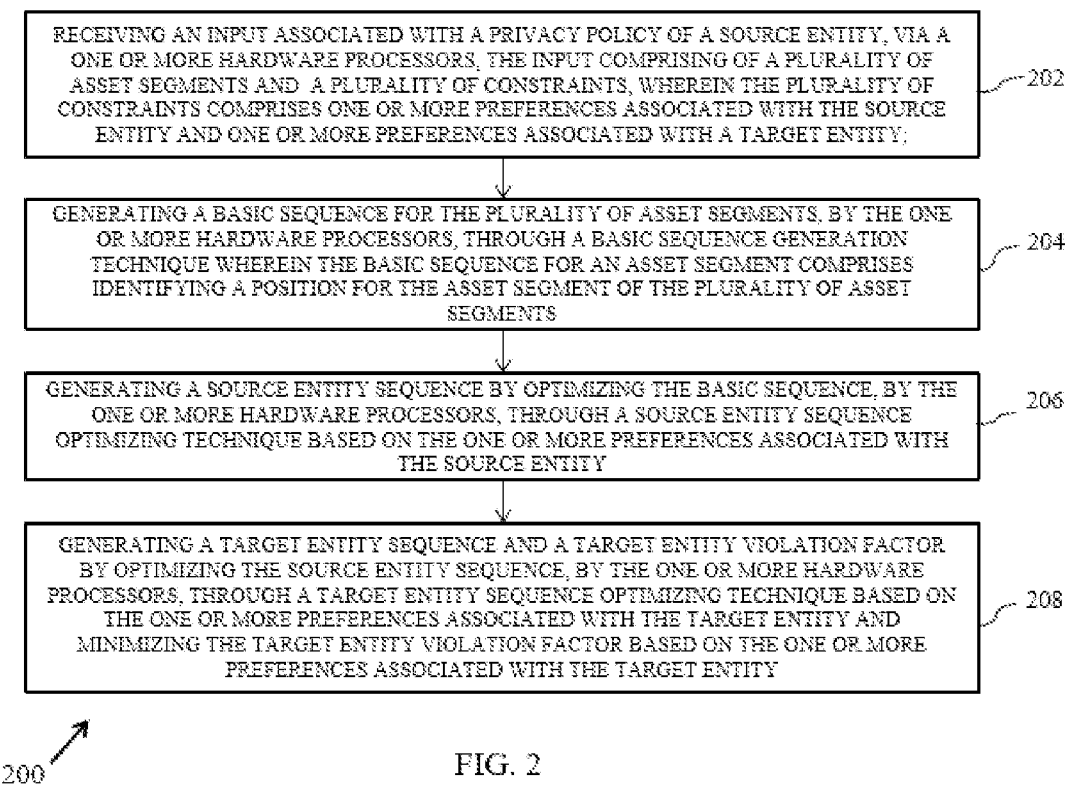
FIG. 2 is a flow diagram of a method for sequencing asset segments of a privacy policy using optimization techniques is described in accordance with the block diagram according to some embodiments of the present disclosure.
Figure 3:
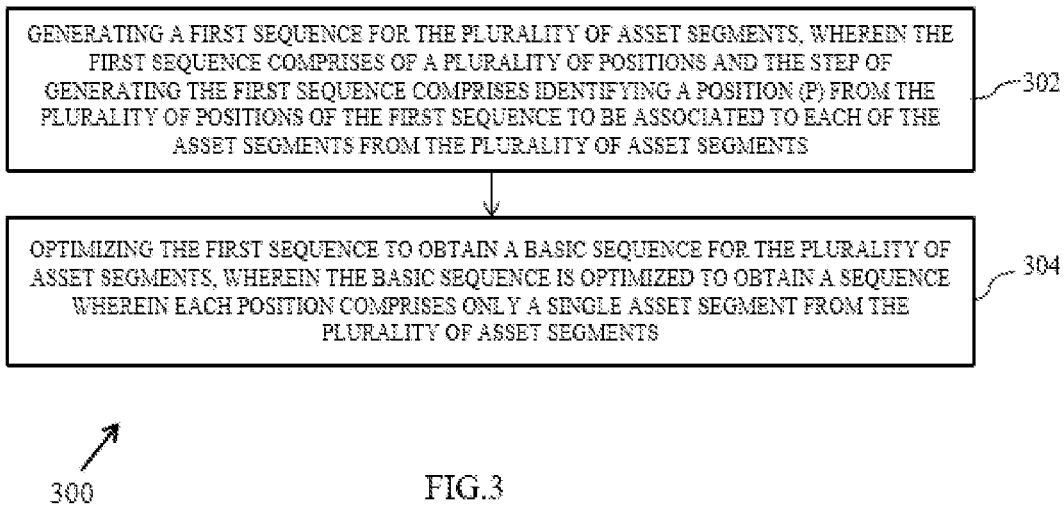
FIG. 3 illustrates a flow diagram of a method for a basic sequence generation technique to obtain a basic sequence for sequencing asset segments of a privacy policy, in accordance with an example embodiment of the disclosure.

Referring now to the drawings, and more particularly to FIG. 1 through FIG. 3, where similar reference characters denote corresponding features consistently throughout the figures, there are shown preferred embodiments and these embodiments are described in the context of the following exemplary system and/or method.

FIG. 1 illustrates a block diagram of a system 100 for a method and a system for sequencing asset segments of a privacy policy using optimization techniques, according to some embodiments of the present disclosure. The disclosed system 100 determines an optimal sequence/arrangement of a plurality of asset segments associated with a privacy policy associated with any entity or organization.

In an embodiment, the system 100 determines an optimal sequence/arrangement of a plurality of asset segments of a source entity based on a plurality of preferences associated with a source entity and a target entity. The 'source entity' may refer to an organization or a concerned individual representative from the organization and the 'target entity' may refer to another organization or another concerned individual representative from the target entity. In an example scenario, the plurality of asset segments comprising of audio or video snippets or audio-video sequence of the source entity are sequenced in an optimal order based on the source entity preferences and the target entity preferences.

In another embodiment, the system 100 determines an optimal sequence/arrangement of a plurality of asset segments of the organization based on a plurality of constraints or preferences associated with the organization as well as viewers or end users of the privacy policy. In an example scenario, the plurality of asset segments comprising of audio or video snippets are sequenced in an optimal order based on the organization preferences and an user preferences, wherein the 'user' may refer to another organization or a concerned individual representative from the organization.

When an input associated with a privacy policy of a source entity is provided as an input, the system 100 optimally sequences the input based on the source entity preferences and the target entity preferences. The input comprising of plurality of asset segments and a plurality of constraints is optimally sequenced based on an optimal sequence generated in several steps, wherein the several steps comprise of generating a basic sequence through a basic sequence generation technique, generating a source entity sequence by optimizing the basic sequence through a source entity sequence optimizing technique and finally generating a target entity sequence and a target entity violation factor by optimizing the source entity sequence through a target entity sequence optimizing technique based on the one or more preferences associated with the target entity. The target entity violation factor represents a conflict between the one or more preferences associated with the source entity and the one or more preferences associated with the target entity while optimizing the source entity sequence to obtain the target entity sequence. The system 100 also considers minimizing the target entity violation factor while optimizing the target entity sequence. Alternatively, the disclosed system may be capable of just optimizing the sequences the plurality of asset segments for just source entity or for just target entity.

Hence the present disclosure determines an optimal sequence/arrangement of a plurality of asset segments associated with a privacy policy of an organization. The optimal sequence/arrangement of the plurality of asset segments is determined based on a plurality of constraints or preferences associated with the source entity/organization of the privacy policy and the target entity/organization/individual who views/uses the privacy policy. The asset segment thus sequenced according to preferences of the source entity and the target entity may represent an alternative for the online text-based privacy policy statement. Hence the present disclosure bridges a communication gap between privacy policy to the end users over long text-based policy statements by displaying the most relevant privacy policy mapped to asset segments) in an optimal sequence by considering the constraints or preferences associated with the organization as well as end users.

The system 100 includes or is otherwise in communication with one or more hardware processors such as a processor 102, at least one memory such as a memory 104, and an I/O interface 106. The processor 102, memory 104, and the I/O interface 106 may be coupled by a system bus such as a system bus 108 or a similar mechanism. The I/O interface 106 may include a variety of software and hardware interfaces, for example, a web interface, a graphical user interface, and the like The interfaces 106 may include a variety of software and hardware interfaces, for example, interfaces for peripheral device(s), such as a keyboard, a mouse, an external memory, a camera device, and a printer. Further, the interfaces 106 may enable the system 100 to communicate with other devices, such as web servers and external databases. The interfaces 106 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 106 may include one or more ports for connecting a number of computing systems with one another or to another server computer. The I/O interface 106 may include one or more ports for connecting a number of devices to one another or to another server.

The hardware processor 102 may be implemented as one or more microprocessors, microcomputers, microcontrollers, digital signal processors, central processing units, state machines, logic circuitries, and/or any devices that manipulate signals based on operational instructions. Among other capabilities, the hardware processor 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 120 and a repository 140 for storing data processed, received, and generated by one or more of the modules 120. The modules 120 may include routines, programs, objects, components, data structures, and so on, which perform particular tasks or implement particular abstract data types.

The repository 140, amongst other things, includes a system database 142 and other data 144, 146 and 148. The other data 144, 146 and 148 may include data generated as a result of the execution of one or more modules in the other modules 130. In an embodiment, the repository 140 may include a privacy policy (PP) repository, a asset segment repository and a constraints repository. The PP repository may include a plurality of privacy policies obtained from the source entity, which is dynamic and is updated at real time with the current privacy policy of the source entity/organization/online services, wherein each asset segment is mapped to the privacy policy of the source entity. The asset segment repository may include a plurality of video templates or video snippets or audio templates or audio snippets or audio-video snippets or audio-video templates in various formats. The constraints repository may include a plurality of constraints, wherein the plurality of constraints comprises of one or more preferences associated with the source entity and one or more preferences associated with the target entity.

Referring to FIG. 2, a flow diagram of a method 200 for sequencing asset segments of a privacy policy using optimization techniques is described in accordance with an example embodiment. The method 200 depicted in the flow chart may be executed by a system, for example, the system, 100 of FIG. 1. In an example embodiment, the system 100 may be embodied in a computing device.

Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 200 are described with help of system 100. However, the operations of the method 200 can be described and/or practiced by using any other system.

At 202 of the method 200, the system 100 receives an input associated with a privacy policy of a source entity, via a one or more hardware processors. The input comprising of a plurality of asset segments and a plurality of constraints, wherein the plurality of constraints comprises one or more preferences associated with the source entity and one or more preferences associated with a target entity.

In an embodiment, the plurality of asset segments may comprise one of a set of audio-video templates, a set of audio templates and a set of video template, wherein each asset segment is mapped to the privacy policy of the source entity. The privacy policy associated with the source entity may include one or more of, for example, a text document (such as PDF, .txt document, .word document, and so on), a weblink to the text based policy and so on and the source entity is a 'source entity' that refers to an organization or a concerned individual representative from the organization. Herein, the target entity may be an organization for which the asset segments have to be re-sequenced based on the target entity preferences, while also considering the source entity preferences.

In an example embodiment, the organization of source entity/target entity may belong to various sectors including, but not limited to, e-Commerce, retail, technology, entertainment, banking and finance. The organizations may further have varying degrees of their overall popularity, worldwide recognition, use and overall asset evaluation. Further the target entity and the plurality of users may include but are not limited to organization(s) similar to organization under consideration, employees of said organization(s), or users accessing website of such organization(s).

In an embodiment, the privacy policies content can be classified into various sections. For instance, the privacy policies may include content classified into various asset segments including, but not limited to Collection of Information, Security, Sharing, User Choices, Cookies and so on. Each of the asset segments comprises of sub-asset segments of the PP and is assigned a position, wherein the position in a sequence is the order of display of the plurality of the asset segments as it is displayed to a source entity or a target entity. Examples of asset segment may include, but are not limited to, personal information, cookies, information sharing, information security, third party advertisers, accessible Information, customer choices, children privacy policies, and privacy shield. An example of the asset segment along with corresponding sub-asset segments is described in TABLE 5. Herein, it will be understood that the example provided in table 5 is only for illustrative purposes and should not be construed as limiting to the embodiments.

TABLE 5

Example of asset segments with sub-asset segments of privacy policy

| Asset segments of Privacy Policy | Sub-asset segments |
| --- | --- |
| Cookies | What are Cookies? |
|  | Disabling Cookies |
|  | Features enabled by Cookies |
|  | Do we store Cookies? |
|  | How Cookies are stored? |
| Personal Information | Need of collecting PII |
|  | Different types of PII collected |
|  | How we collect PII? |
|  | What is personally identifiable information PII? |
| Children's Policies | Can children access the services? |
|  | Advertisement specifications for children |
|  | Parents' consent requirements |
|  | Parent monitoring |
|  | Services available for children |
|  | Minimum age requirement |

An example of the asset segments privacy policies with constraints that include one or more preferences associated with the source entity and one or more preferences associated with a target entity is described below under two sections titled source entity preference and target entity preference:

Source Entity Preference:

In cookies asset segment, source entity prefers the sub-asset segment "What are Cookies?" to be sequenced before other sub-assets. Similarly, source entity also prefers to: a) Sequence sub-asset "Do we store cookies?" before sub-asset "Features enabled by Cookies" and b) Sequence sub-asset "Features enabled by Cookies" before sub-asset "How Cookies are stored?".

In personal information asset segment, source entity prefers the sub-asset segment "What is personally identifiable information PII?" to be sequenced before other sub-assets.

In children's policies asset segment, source entity prefers the sub-asset segments "Can children access the services?" and "Minimum age requirement" to be sequenced before other sub-assets.

Further the source entity prefers to sequence the "Personal Information" asset segment before other segments and to sequence the "Privacy Shield" asset segment after other segments.

Also, the source entity prefers to sequence "Information Sharing" and "Information Security" before "Third Party Advertisers".

Target Entity Preferences:

In cookies asset segment, the target entity prefers to view "Disabling Cookies" sub-asset first since he/she is interested in knowing how to disable cookies.

In personal information asset segment, the target entity prefers to view "Need of collecting PII" and "Different types of PII collected" before other sub-asset segments since he/she is interested in knowing what information is collected from him/her and how the collected information is used.

In children's policies asset segment, the target entity prefers to view "Parents' consent requirements" and "Parent monitoring" before other sub-asset segments since he/she is interested in knowing the role of parents.

Further the target entity prefers to view "Children's Policies" before other asset segments.

In an embodiment, the one or more preferences associated with the source entity comprises a plurality of source entity dependencies and the one or more preferences associated with a target entity comprises a plurality of target entity user preferences.

In an example, the input comprises of the plurality of asset segments and the plurality of constraints, wherein the plurality of constraints comprises one or more preferences associated with the source entity and one or more preferences associated with a target entity which is expressed as shown below:

A→Asset segments to be sequenced $\beta_{ij}$→one or more preferences associated with the source entity $\alpha_{ij}$→one or more preferences associated with the target entity Here $\beta_{ij}$ takes value 1 if source entity dictates asset i to be sequenced before j & $\alpha_{ij}$ takes value 1 if target entity prefers asset i to be sequenced before j.

At 204, the method 200 includes generating a basic sequence for the plurality of asset segments, by the one or more hardware processors, through a basic sequence generation technique wherein the basic sequence for an asset segment comprises identifying a position for the asset segment of the plurality of asset segments, as will be explained below with reference to the flow chart as illustrated in FIG. 3

Referring to FIG. 3, basic sequence generation technique is illustrated in accordance with an example embodiment wherein:

At 302 of the method 300, the system 100 generates a first sequence for the plurality of asset segments. The first sequence comprises of a plurality of positions and the step of generating the first sequence comprises identifying a position (p) from the plurality of positions of the first sequence to be associated to each of the asset segments from the plurality of asset segments.

In an embodiment, a first constraint is defined for every asset segment to be positioned exactly at one of the positions in the first sequence and is expressed as first constraint $\Sigma_{k \in P} y_{ik} = 1$, wherein P represents a set of positions. The first constraint, $\Sigma_{k \in P} y_{ik} = 1$ enforces a solver in system 100 to construct a basic sequence such that only one asset is positioned at each position of the first sequence. In an embodiment, the solver utilized is based on a heuristic techniques such as a branch-and-bound/branch-and-cut method. The branch-and-bound/branch-and-cut method iteratively explores multiple mutually disjoint feasible sub-regions in an optimization model's feasibility region to compute am optimal solution for a given proble . . . . For example, if in a sequence, asset i is positioned at two places, then $\Sigma_{k \in P} y_{ik} = 2$, which violates the constraint. Hence, such a sequence will never be explored by the solver. The generation of the first sequence for the plurality of asset segments can be expressed as:

$$\sum_{k \in P} y_{ik} = 1 \forall i \in A$$

At 304 of the method 300, the system 100 optimizes the first sequence to obtain a basic sequence for the plurality of asset segments. The basic sequence is optimized to obtain a sequence wherein each position comprises only a single asset segment from the plurality of asset segments.

In an embodiment, the first sequence is optimized based on a second constraint to obtain a basic sequence for the plurality of asset segments The second constraint optimizes the first sequence to obtain a basic sequence wherein each position comprises only a single asset segment from the plurality of asset segments term and is expressed as $\Sigma_{i \in A} y_{ik} = 1$. The second constraint enforces the solver in system 100 to construct a basic sequence such that an asset segment is positioned at exactly one position. For example, if in a sequence, two assets are positioned at the same position, then $\Sigma_{i \in A} y_{ik} = 2$, which violates the constraint. Hence, such a sequence will never be explored by the solver. The generation of the basic sequence for the plurality of asset segments can be expressed as:

$$\sum_{i \in A} y_{ik} = 1 \forall k \in P$$

At 206 of the method 200, the system 100 generates a source entity sequence by optimizing the basic sequence, by the one or more hardware processors, through a source entity sequence optimizing technique based on the one or more preferences associated with the source entity In an embodiment, the source entity sequence optimizing technique comprises generating a source entity sequence by re-sequencing the position assigned to each asset segment based on the one of more preferences associated with the source entity which can be expressed as shown below:

$$\Sigma_{k \in P} k y_{ik} \leq \Sigma_{k \in P} k y_{jk}$$

wherein, $\Sigma_{k \in P} k y_{ik}$ and $\Sigma_{k \in P} k y_{jk}$ indicates the positions of asset segments i and j, respectively, wherein the asset segment i is to be placed before asset segment j as dictated by the source entity dependencies, and $y_{ik}$ takes value 1 if asset i is sequenced at position k.

The source entity sequence optimizing ensures that one or more preferences associated with the source entity is maintained in the basic sequence. When $\beta_{ij} = 1$ (i.e., one or more preferences associated with the source entity dictates asset i to be sequenced before asset j), the following constraint becomes: $\Sigma_{k \in P} k y_{ik} \leq \Sigma_{k \in P} k y_{jk}$. Here $\Sigma_{k \in P} k y_{ik}$ and $\Sigma_{k \in P} k y_{jk}$ indicates the positions of assets i and j, respectively. Hence, $\Sigma_{k \in P} k y_{ik} \leq \Sigma_{k \in P} k y_{jk}$ enforces the solver in the system 100 to construct only those sequences where asset i is sequenced before j when $\beta_{ij} = 1$.

At 206 of the method 300, the system 100 generates a target entity sequence and a target entity violation factor by optimizing the source entity sequence, by the one or more hardware processors, through a target entity sequence optimizing technique based on the one or more preferences associated with the target entity and minimizing the target entity violation factor based on the one or more preferences associated with the target entity.

In an embodiment, the target entity violation factor ($x_{ij}$) represents a conflict between the one or more preferences associated with the source entity and the one or more preferences associated with the target entity while optimizing the source entity sequence to obtain the target entity sequence.

In an embodiment, the target entity sequence optimizing technique comprises of generating a target entity sequence by re-sequencing the position assigned to each asset segment based on the one preferences associated with the target entity while minimizing a summation of the target entity violation factors, which can be expressed as shown below:

$$n x_{ij} \geq \Sigma_{k \in P} k y_{ik} - \Sigma_{k \in P} k y_{jk}.$$

wherein, $\Sigma_{k \in P} k y_{ik}$ and $\Sigma_{k \in P} k y_{ik}$ indicates the positions of assets segments i and j, respectively, wherein the asset segment i is to be placed before asset segment j as dictated by the target entity dependencies, while minimizing the summation of target entity violation factor $\min \Sigma_{i \in A} \Sigma_{j \in A} x_{ij}$.

The target entity sequence optimizing technique captures any violation in target entity preference, wherein any violation in the target entity sequence is identified by the solver of the system 100. Suppose $\alpha_{ij} = 1$ (i.e., target entity prefers to sequence asset i before asset j), then the following constraint becomes: $n x_{ij} \geq \Sigma_{k \in P} k y_{ik} - \Sigma_{k \in P} k y_{jk}$. If in a sequence $\Sigma_{k \in P} k y_{ik} > \Sigma_{k \in P} k y_{jk}$ (i.e., asset i is sequenced after asset j), then $x_{ij}$ is enforced to be 1, thus capturing the violation in user preference.

$$n x_{ij} \geq \left[ \sum_{k \in P} k y_{ik} - \sum_{k \in P} k y_{jk} \right] \alpha_{ij} \forall i \in A, j \in A$$

The goal of the target entity sequence optimizing technique is to minimize the total number of violations in target entity preferences. The term $\Sigma_{i \in A} \Sigma_{j \in A} x_{ij}$ indicates the number of target entity preference violations in a sequence. Minimizing this term helps the solver of system 100 to construct a target entity sequence by optimizing the source entity sequence with least number of violations $$\min \sum_{i \in A} \sum_{j \in A} x_{ij}$$

Bounds of the decision variables are captured by the following constraints. The following constraints enforce the solver of system 10 to fix only binary values (0 or 1) for x and y.

$$x_{ij} \in \{0,1\} \forall i \in A, j \in A$$

$$y_{ik} \in \{0,1\} \forall i \in A, k \in P$$

Further upon generating the target entity sequence, the plurality of asset segments is arranged in an optimal sequence, where the optimal sequence comprises optimally re-sequencing the plurality of asset segments by the position assigned to each of the asset segments based on the source entity sequence and the target entity sequence generated based on the plurality of constraints of the plurality of asset segments to be met. The plurality of asset segments is arranged in an optimal sequence and the target entity violation factor is displayed on the I/O interface 106 of system 100.

Example:

An example wherein a plurality of assets associated with different information related to privacy policies along with the sub-segments is shared below in TABLE 6. Herein, it will be understood that the example provided in TABLE 6 is only for illustrative purposes and should not be construed as limiting to the embodiments.

TABLE 6

Example of asset segment with sub-asset segments of privacy policy

| Asset segments of Privacy Policy | Sub-asset segments |
|---|---|
| Personal Information | A1, A2, A3, A4 |
| Cookies | B1, B2, B3, B4, B5 |
| Third Party Advertisers | C1, C2, C3, . . . |
| Customer Choices | D1, D2, D3, . . . |
| Information Sharing | E1, E2, E3, . . . |
| Information Security | F1, F2, F3, . . . |
| Privacy Shield | G1, G2, G3, . . . |
| Accessible Information | H1, H2, H3, . . . |
| Children's Policies | I1, I2, I3, I4, I5, I6 |

In an embodiment, the sub-assets segments are certain topics related to the asset segments. An example scenario is as shown below in TABLE 7, wherein the sub-asset segments of three asset segments are described. Herein, it will be understood that the example provided in TABLE 7 is only for illustrative purposes and should not be construed as limiting to the embodiments.

TABLE 7

Asset segment with sub-asset segments (descriptive) of privacy policy

| Asset segments of Privacy Policy | Sub-asset segments |
|---|---|
| Cookies | B1: What are Cookies? |
| | B2: Disabling Cookies |
| | B3: Features enabled by Cookies |
| | B4: Do we store Cookies? |
| | B5: How Cookies are stored? |
| Personal Information | A1: Need of collecting PII |
| | A2: Different types of PII collected |
| | A3: How we collect PII? |
| | A4: What is personally identifiable information PII? |
| Children Policies | I1: Can children access the services? |
| | I2: Advertisement specifications for children |
| | I3: Parents' consent requirements |
| | I4: Parent monitoring |
| | I5: Services available for children |
| | I6: Minimum age requirement |

The one or more preferences associated with source entity and the one or more preferences associated with target entity for asset segments shared below:

Source Entity Preference:

In cookies asset segment, source entity prefers the sub-asset segment "What are Cookies?" to be sequenced before other sub-assets. Similarly, source entity also prefers to: a) Sequence sub-asset "Do we store cookies?" before sub-asset "Features enabled by Cookies" and b) Sequence sub-asset "Features enabled by Cookies" before sub-asset "How Cookies are stored?".

In personal information asset segment, source entity prefers the sub-asset segment "What is personally identifiable information PII?" to be sequenced before other sub-assets.

In children's policies asset segment, source entity prefers the sub-asset segments "Can children access the services?" and "Minimum age requirement" to be sequenced before other sub-assets.

Further the source entity prefers to sequence the "Personal Information" asset segment before other segments and to sequence the "Privacy Shield" asset segment after other segments.

Also, the source entity prefers to sequence "Information Sharing" and "Information Security" before "Third Party Advertisers".

Target Entity Preferences:

In cookies asset segment, the target entity prefers to view "Disabling Cookies" sub-asset first since he/she is interested in knowing how to disable cookies.

In personal information asset segment, the target entity prefers to view "Need of collecting PII" and "Different types of PII collected" before other sub-asset segments since he/she is interested in knowing what information is collected from him/her and how the collected information is used.

In children's policies asset segment, the target entity prefers to view "Parents' consent requirements" and "Parent monitoring" before other sub-asset segments since he/she is interested in knowing the role of parents.

Further the user prefers to view "Children's Policies" before other asset segments.

For the example shared above, upon applying the proposed optimization techniques the sequence obtained is as follows:

Generating a basic sequence for the plurality of asset segments, through a basic sequence generation technique to identifying a position for the asset segment of the plurality of asset segments as shown below in TABLE 8, wherein more asset segments and sub-asset segments are seen. Herein, it will be understood that the example provided in TABLE 8 is only for illustrative purposes and should not be construed as limiting to the embodiments.

TABLE 8

Identifying a position for the asset segment of the plurality of asset segments

| Position of Assets | Asset segments of Privacy Policy | Sub-asset segments |
|---|---|---|
| 1 | Personal Information | A1, A2, A3, A4 |
| 2 | Cookies | B1, B2, B3, B4, B5 |
| 3 | Third Party Advertisers | C1, C2, C3, . . . |
| 4 | Customer Choices | D1, D2, D3, . . . |
| 5 | Information Sharing | E11, E22, E3, . . . |
| 6 | Information Security | F1, F2, F3, . . . |
| 7 | Privacy Shield | G1, G2, G3, . . . |
| 8 | Accessible Information | H1, H2, H3, . . . |
| 9 | Children's Policies | I1, I2, I3, I4, I5, I6 |

Generating a source entity sequence by optimizing the basic sequence through a source entity sequence optimizing technique based on the one or more preferences associated with the source entity. The source entity sequence is as shown below in TABLE 9. Herein, it will be understood that the example provided in TABLE 9 is only for illustrative purposes and should not be construed as limiting to the embodiments.

TABLE 9

Source entity sequence

| Position of asset segments | Re-sequenced asset segments based on preferences of source entity | Source entity sequence of sub-asset segments (Sub-asset segments based on preferences of source entity) |
|---|---|---|
| 1 | Personal Information | A4. What is personally identifiable information PII? <br> A1. Need of collecting PII <br> A2. How we collect PII? <br> A3. Different types of PII collected |
| 2 | Cookies | B1. What are Cookies? <br> B4. Do we store Cookies? <br> B3. Features enabled by Cookies <br> B5. How Cookies are stored? <br> B2. Disabling Cookies |
| 5 | Information Sharing | E1, E2, E3, . . . |
| 6 | Information Security | F1, F2, F3, . . . |
| 3 | Third Party Advertisers | C1, C2, C3, . . . |
| 8 | Accessible Information | H1, H2, H3, . . . |
| 4 | Customer Choices | D1, D2, D3, . . . |
| 9 | Children's Policies | I1. Can children access the services? <br> I6. Minimum age requirement <br> I3. Parents' consent requirements <br> I4. Parent monitoring <br> I5. Services available for children <br> I2. Advertisement specifications for children |
| 7 | Privacy Shield | G1, G2, G3, . . . |

Generating a target entity sequence and a target entity violation factor by optimizing the source entity sequence, through a target entity sequence optimizing technique based on the one or more preferences associated with the target entity. The target entity sequence is as shown below in TABLE 10. Herein, it will be understood that the example provided in TABLE 10 is only for illustrative purposes and should not be construed as limiting to the embodiments.

TABLE 10

Target entity sequence

| Position of asset segments | Sequence of Asset segments of Privacy Policy based on target entity | Sub-asset segments based on preferences of target entity |
|---|---|---|
| 1 | Personal Information | A4. What is personally identifiable information PII? <br> A1. Need of collecting PII <br> A2. Different types of PII collected <br> A3. How we collect PII? |
| 9 | Children's Policies | I1. Can children access the services? <br> I6. Minimum age requirement <br> I3. Parents' consent requirements <br> I4. Parent monitoring <br> I5. Services available for children. <br> I2. Advertisement specifications for children |
| 2 | Cookies | B1. What are Cookies? <br> B2. Disabling Cookies <br> B4. Do we store Cookies? <br> B5. How Cookies are stored? <br> B3. Features enabled by Cookies |
| 5 | Information Sharing | E1, E2, E3, . . . |
| 6 | Information Security | F1, F2, F3, . . . |
| 3 | Third Party Advertisers | C1, C2, C3, . . . |
| 8 | Accessible Information | H1, H2, H3, . . . |
| 4 | Customer Choices | D1, D2, D3, . . . |
| 7 | Privacy Shield | G1, G2, G3, . . . |

The target violations for the above example are as follows:

In personal information, target entity prefers to view "Need of collecting PII" (A1) and "Different types of PII collected" (A2) first but since source entity mandates to view "What is Personally Identifiable Information (PII)?" (A4) first, we have 2 target entity violations.

In cookies, target entity prefers to view B2 before other assets. This preference is violated since source entity mandates B1 to be viewed first. Hence, violation factor is 1.

Similarly, in Children's policy, the violation factor is 4 (Target prefers viewing I3 and I4 first but source mandates I1 and I6 to be viewed first)

Also, the target entity prefers to view the Children's policy asset before viewing other assets but source entity mandates viewing Personal Information Asset first. Hence, violation factor is 1.

Hence the total violation factor is 2+1+4+1=8

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclosed herein provides method and system that determines an optimal sequence/arrangement of a plurality of asset segments from a source entity based on a plurality of preferences associated with the source entity and a target entity. Further the disclosed system also determines a target entity violation factor that represents a conflict between the one or more preferences associated with the source entity and the one or more preferences associated with the target entity while determining the optimal sequence for arrangement of a plurality of asset segments. For example, in an embodiment the system optimally sequences the plurality of asset segments in several steps, wherein the several steps comprise of generating a basic sequence through a basic sequence generation technique, generating a source entity sequence by optimizing the basic sequence through a source entity sequence optimizing technique and finally generating a target entity sequence and a target entity violation factor by optimizing the source entity sequence through a target entity sequence optimizing technique based on the one or more preferences associated with the target entity. The plurality of asset segments is then arranged in an optimal sequence based on the target entity sequence. Alternatively, the disclosed system may be capable of just optimizing the sequences the plurality of asset segments for just source entity or for just target entity. Hence the present disclosure bridges a communication gap between privacy policy to the end users by displaying the most relevant privacy policy (that is mapped to a plurality of asset segments) in an optimal sequence by considering the constraints or preferences associated with the organization as well as end users.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means.

The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

We claim:

1. A processor-implemented method comprising:

receiving an input associated with a privacy policy of a source entity, via a one or more hardware processors, the input comprising a plurality of asset segments and a plurality of constraints, wherein the plurality of constraints comprises one or more preferences associated with the source entity and one or more preferences associated with a target entity;

generating a basic sequence for the plurality of asset segments, by the one or more hardware processors, through a basic sequence generation technique wherein the basic sequence for an asset segment of the plurality of asset segments, comprises identifying a position for the asset segment of the plurality of asset segments, wherein the plurality of asset segments comprises a set of audio-video templates, a set of audio templates and a set of video templates, wherein each asset segment is mapped to the privacy policy of the source entity and the plurality of asset segments are sequenced in an optimal order based on the one or more preferences associated with the source entity and the target entity, and wherein a plurality of privacy policies are obtained from the source entity, the plurality of privacy policies are dynamic and updated at real time with a current privacy policy of the source entity;

generating a source entity sequence by optimizing the basic sequence, by the one or more hardware processors, through a source entity sequence optimizing technique based on the one or more preferences associated with the source entity; and generating a target entity sequence and a target entity violation factor by optimizing the source entity sequence, by the one or more hardware processors, through a target entity sequence optimizing technique based on the one or more preferences associated with the target entity and minimizing the target entity violation factor, wherein the minimizing of the target entity violation factor is based on the one or more preferences associated with the target entity, and wherein the target entity violation factor ($x_{ij}$) represents a conflict between the one or more preferences associated with the source entity and the one or more preferences associated with the target entity while optimizing the source entity sequence to obtain the target entity sequence.

2. The method of claim 1, further comprises displaying the plurality of asset segments and the target entity violation factor, wherein the plurality of asset segments are displayed in an optimal sequence, wherein the optimal sequence comprises optimally re-sequencing the plurality of asset segments by a position assigned to each asset segment of the plurality of asset segments, based on the source entity sequence and the target entity sequence generated based on the plurality of constraints of the plurality of asset segments to be met.

3. The method of claim 1, wherein the one or more preferences associated with the source entity comprises a plurality of source entity dependencies, and wherein the one or more preferences associated with the target entity comprises a plurality of target entity user preferences.

4. The method of claim 1, wherein the basic sequence generation technique comprises:
  generating a first sequence for the plurality of asset segments, wherein the first sequence comprises a plurality of positions and wherein generating the first sequence comprises identifying a position (p) from the plurality of positions of the first sequence to be associated to each asset segment of from the plurality of asset segments; and
  optimizing the first sequence to obtain a basic sequence for the plurality of asset segments, wherein the basic sequence is optimized to obtain a sequence wherein each position comprises only a single asset segment of the plurality of asset segments.

5. The method of claim 1, wherein the source entity sequence optimizing technique comprises generating the source entity sequence by re-sequencing the position assigned to each asset segment of the plurality of asset segments based on the one of more preferences associated with the source entity which can be expressed as shown below:

$$\Sigma_{k \in P} k y_{ik} \leq \Sigma_{k \in P} k y_{jk}$$

wherein, $\Sigma_{k \in P} k y_{ik}$ and $\Sigma_{k \in P} k y_{jk}$ indicates the positions of assets segments i and j, respectively, wherein the asset segment i is to be placed before asset segment j as dictated by the source entity dependencies, P represents a set of positions and $y_{ik}$ takes value 1 if asset i is sequenced at position k.

6. The method of claimed in claim 1, wherein the target entity sequence optimizing technique comprises generating the target entity sequence by re-sequencing a position assigned to each asset segment of the plurality of asset segments, based on the one or more preferences associated with the target entity while minimizing a summation of the target entity violation factor($x_{ij}$), which can be expressed as shown below:

$$n x_{ij} \geq \Sigma_{k \in P} k y_{ik} - \Sigma_{k \in P} k y_{jk}.$$

wherein, $\Sigma_{k \in P} k y_{ik}$ and $\Sigma_{k \in P} k y_{ik}$ indicates the positions of assets segments i and j, respectively, wherein the asset segment i is to be placed before asset segment j as dictated by the target entity dependencies, while minimizing the summation of target entity violation factor min $\Sigma_{i \in A} y_{ik} = 1$, where A is the plurality of asset segments.

7. A system, comprising:
  an input/output interface;
  one or more memories; and
  one or more hardware processors, wherein the one or more memories coupled to the one or more hardware processors, wherein the one or more hardware processors are configured to execute programmed instructions stored in the one or more memories, to:
  receive an input associated with a privacy policy of a source entity, via a one or more hardware processors, the input comprising a plurality of asset segments and a plurality of constraints, wherein the plurality of constraints comprises one or more preferences associated with the source entity and one or more preferences associated with a target entity;
  generate a basic sequence for the plurality of asset segments, by the one or more hardware processors, through a basic sequence generation technique wherein the basic sequence for an asset segment of the plurality of asset segments, comprises identifying a position for the asset segment of the plurality of asset segments, wherein the plurality of asset segments comprises a set of audio-video templates, a set of audio templates and a set of video templates, wherein each asset segment is mapped to the privacy policy of the source entity and the plurality of asset segments are sequenced in an optimal order based on the one or more preferences associated with the source entity and the target entity, wherein a plurality of privacy policies are obtained from the source entity, the plurality of privacy policies are dynamic and updated at real time with a current privacy policy of the source entity;
  generate a source entity sequence by optimizing the basic sequence, by the one or more hardware processors, through a source entity sequence optimizing technique based on the one or more preferences associated with the source entity; and
  generate a target entity sequence and a target entity violation factor by optimizing the source entity sequence, by the one or more hardware processors, through a target entity sequence optimizing technique based on the one or more preferences associated with the target entity and minimizing the target entity violation factor, wherein the minimizing of the target entity violation factor is based on the one or more preferences associated with the target entity, and wherein the target entity violation factor ($x_{ij}$) represents a conflict between the one or more preferences associated with the source entity and the one or more preferences associated with the target entity while optimizing the source entity sequence to obtain the target entity sequence.

8. The system of claim 7, wherein the one or more hardware processors are configured by the instructions to display the plurality of asset segments in an optimal sequence and the target entity violation factor, wherein the optimal sequence comprises optimally re-sequencing the plurality of asset segments by a position assigned to each asset segment of the plurality of asset segments, based on the source entity sequence and the target entity sequence generated based on the plurality of constraints of the plurality of asset segments to be met.

9. The system of claim 7, wherein the one or more hardware processors are further configured by the instructions to generate the basic sequence generation based on the basic sequence generation technique wherein the basic sequence generation technique includes:
  generate a first sequence for the plurality of asset segments, wherein the first sequence comprises a plurality of positions, wherein generating the first sequence comprises identifying a position (p) from the plurality of positions of the first sequence to be associated to each asset segment of the plurality of asset segments; and
  optimize the first sequence to obtain the basic sequence for the plurality of asset segments, wherein the basic sequence is optimized to obtain a sequence wherein each position comprises only a single asset segment of the plurality of asset segments.

10. The system of claim 7, wherein the one or more hardware processors are configured by the instructions to perform the source entity sequence optimizing technique comprises generating the source entity sequence by re-sequencing the position assigned to each asset segment of the plurality of asset segments based on the one or more preferences associated with the source entity which can be expressed as shown below:

$$\Sigma_{k \in P} k y_{ik} \leq \Sigma_{k \in P} k y_{jk}$$

wherein, $\Sigma_{k\in P}ky_{ik}$ and $\Sigma_{k\in P}ky_{jk}$ indicates the positions of assets segments i and j, respectively, wherein the asset segment i is to be placed before asset segment j as dictated by the source entity dependencies, P represents a set of positions and $y_{ik}$ takes value 1 if asset i is sequenced at position k.

11. The method of claim 7, wherein the one or more hardware processors are configured by the instructions to perform the target entity sequence optimizing technique comprises generating the target entity sequence by re-sequencing a position assigned to each asset segment of the plurality of asset segments based on the one or more preferences associated with the target entity while minimizing a summation of the target entity violation factors, which can be expressed as shown below:

$$nx_{ij} \geq \Sigma_{k\in P}ky_{ik} - \Sigma_{k\in P}ky_{jk}.$$

wherein, $\Sigma_{k\in P}ky_{ik}$ and $\Sigma_{k\in P}ky_{ik}$ indicates the positions of assets segments i and j, respectively, wherein the asset segment i is to be placed before asset segment j as dictated by the target entity dependencies, while minimizing the summation of target entity violation factor min $\Sigma_{i\in A}y_{ik}=1$, where A is a plurality of asset segments.

12. A non-transitory computer-readable medium having embodied thereon a computer readable program, wherein the computer readable program, when executed by one or more hardware processors, cause:

receiving an input associated with a privacy policy of a source entity, via a one or more hardware processors, the input comprising a plurality of asset segments and a plurality of constraints, wherein the plurality of constraints comprises one or more preferences associated with the source entity and one or more preferences associated with a target entity;

generating a basic sequence for the plurality of asset segments, by the one or more hardware processors, through a basic sequence generation technique wherein the basic sequence for an asset segment of the plurality of asset segments comprises identifying a position for the asset segment of the plurality of asset segments, wherein the plurality of asset segments comprises a set of audio-video templates, a set of audio templates and a set of video templates, wherein each asset segment is mapped to the privacy policy of the source entity and wherein a plurality of privacy policies are obtained from the source entity, the plurality of privacy policies are dynamic and updated at real time with a current privacy policy of the source entity;

generating a source entity sequence by optimizing the basic sequence, by the one or more hardware processors, through a source entity sequence optimizing technique based on the one or more preferences associated with the source entity; and generating a target entity sequence and a target entity violation factor by optimizing the source entity sequence, by the one or more hardware processors, through a target entity sequence optimizing technique based on the one or more preferences associated with the target entity and minimizing the target entity violation factor, wherein the minimizing of the target entity violation factor is based on the one or more preferences associated with the target entity, and wherein the target entity violation factor ($x_{ij}$) represents a conflict between the one or more preferences associated with the source entity and the one or more preferences associated with the target entity while optimizing the source entity sequence to obtain the target entity sequence.

\* \* \* \* \*